Sept. 24, 1940.  D. HEYER  2,215,831
VARIABLE SPEED DRIVE
Filed Oct. 24, 1936  4 Sheets-Sheet 1

Fig. 1

INVENTOR
BY Don Heyer
ATTORNEY

Sept. 24, 1940.     D. HEYER     2,215,831
VARIABLE SPEED DRIVE
Filed Oct. 24, 1936     4 Sheets-Sheet 3

INVENTOR.
Don Heyer
BY
*R.C. Weilein*
ATTORNEY.

Sept. 24, 1940.　　　　D. HEYER　　　　2,215,831
VARIABLE SPEED DRIVE
Filed Oct. 24, 1936　　　　4 Sheets-Sheet 4

INVENTOR.
Don Heyer
BY
P. R. Wilkin
ATTORNEY.

Patented Sept. 24, 1940

2,215,831

UNITED STATES PATENT OFFICE 2,215,831

VARIABLE SPEED DRIVE

Don Heyer, Los Angeles, Calif.

Application October 24, 1936, Serial No. 107,479

12 Claims. (Cl. 74—230.17)

This invention relates to a variable speed drive, and more particularly to a variable speed drive, employing a pair of pulley structures and a belt for transmitting power between the pulley structures, and in which the speed adjustment is obtained by adjusting the effective diameter of at least one of the pulley structures. The adjustable pulley structure employed in this drive may include a pair of pulley sections with opposed inclined belt engaging faces, whereby a relative axial adjustment of the pulley sections produces a corresponding change in the effective pulley diameter. Thus if the pulley sections are moved axially toward each other, the belt is forced radially outward to increase the effective pulley diameter. While if the pulley sections are moved axially away from each other, the belt is allowed to move radially inward to reduce the effective diameter of the pulley structure.

In a variable speed drive of this type, either one or both of the pulley structures may be arranged to have an adjustable effective diameter. If both of the pulley structures have an adjustable effective diameter, the center distance between the pulley structures may be maintained constant. An increase in the effective diameter of one of the pulley structures may be compensated for by a corresponding decrease in the effective diameter of the other pulley structure. If only one of the pulley structures is arranged to have an adjustable effective pulley diameter, means must be provided for adjusting the center distance between the driving and driven pulley structures to maintain the belt tension.

Either one or both of the pulley sections of the adjustable pulley structures may be made axially adjustable. If only one of the pulley sections is arranged for axial movement, the belt will be moved axially over the face of the axially fixed pulley section, in the direction of movement of the adjusted pulley section. Thus as the effective diameter of the adjustable pulley structure is adjusted, the center line of the belt will be moved in an axial direction. Thus if only one of the pulley structures of the adjustable speed drive has an adjustable effective diameter, and if only one pulley section of the adjustable pulley structure is arranged for axial movement, then means must be provided for varying, not only the center distance between the axes of the driving and driven pulley structures, but also the relative axial position of the two pulley structures. Thus, if it is desired to maintain the belt in substantial alignment, it is necessary, not only to move one of the pulley structures in a center distance adjusting direction, but also to move one of the pulley structures in an axial direction, simultaneously with the adjustment of the effective pulley diameter.

If both the driving and driven pulley structures have an adjustable effective diameter, and if only one pulley section of each of the adjustable pulley structures is arranged for axial movement, then it is necessary to adjust the opposite facing pulley sections of the driving and driven pulley structures at the relative rates required to maintain the belt tension and to maintain the belt in substantial alignment. However, it is not possible to satisfy both of the conditions of belt alignment and belt tension at the same time. For if the pulley sections are adjusted at the rates required to maintain the belt tension, the belt will not be maintained in alignment. While if the condition of belt alignment is satisfied, the belt will not be maintained at the required driving tension.

It is one of the objects of this invention to provide an adjustable diameter pulley structure, in which simple, and yet effective, means are provided for adjusting the axial positions of both of the pulley sections, and which may be employed in a variable speed drive, in which either one or both of the pulley structures are arranged to have an adjustable effective pulley diameter.

In many variable speed power applications, it is necessary to frequently stop and start the driven load. This necessitates the frequent stopping and starting of the driving motor. This type of operation is particularly severe on the driving motor, if an electric motor is employed as a source of power. For each time the motor is started, the current in the motor windings will be many times greater than the normal motor current. This large current results in a rapid heating of the motor structure. As a result, a motor much larger than that required by the normal motor load will be required.

It is still another object of this invention to provide a variable speed drive, in which means are provided for disconnecting the driving pulley of the variable speed drive from the driving motor, so that the driven load may be repeatedly stopped and started, without the necessity of stopping the driving motor.

In many variable speed drive applications it is desirable to provide means for not only starting and stopping the driven load, without the necessity of stopping the driving motor, but also to provide means whereby the driven load may be positively brought to a standstill without the necessity of stopping the driving motor.

It is still another object of this invention to provide a variable speed drive, in which means are provided for disconnecting the driving pulley structure from the driving motor, and in which additional means are provided for positively bringing the driven load to a standstill, without the necessity of stopping the driving motor.

In many variable speed drive applications, in which it is necessary to start a load having a large inertia, it is desirable that the load be accelerated at a gradual rate and that as long a period as possible be allowed for accelerating the driven load, in order to reduce to a minimum the stress on the driving equipment.

It is still another object of this invention to provide a variable speed drive, in which means are provided for gradually increasing the driving torque of the driving pulley structure, as the speed of the driven load is increased, and for assuring that the variable speed drive is adjusted to the condition of minimum speed of the load driving shaft, before the driving motor is stopped.

This invention possesses other objects and has other applications which will become more easily apparent from a consideration of several forms embodying the invention, which are illustrated by the drawings forming a part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a sectional view, taken along the plane 3—3 of Fig. 2;

Fig. 8a is a circuit diagram of the motor control circuit of the variable speed drive, illustrated by Figs. 1 to 8;

Figure 1:
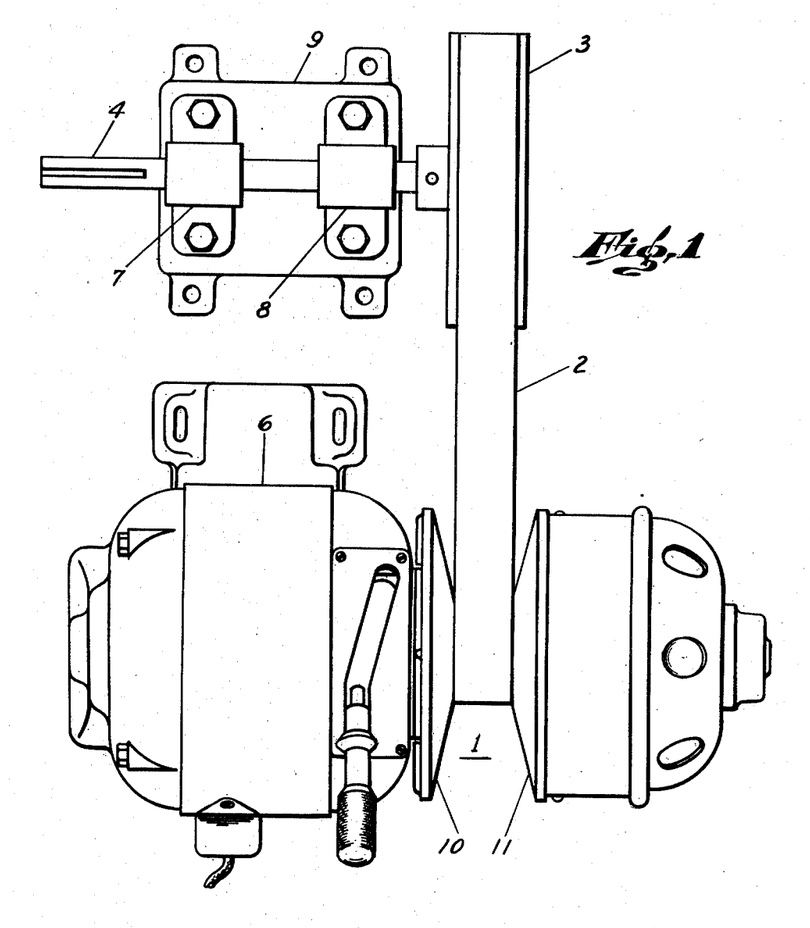
Fig. 1 is a plan view of a variable speed drive, embodying the invention.

Referring to Fig. 1; the variable speed drive includes the driving pulley structure 1, which by means of the belt 2, drives the driven pulley structure 3, mounted on the load driving shaft 4. The driving pulley structure 1, is mounted on the shaft of the driving electric motor 6. As will be described hereinafter, the motor shaft is suitably supported on the frame on the motor 6. The load driving shaft may be provided with the bearings 7 and 8, which are in turn supported by the base plate 9. The driving pulley structure 1, includes the pulley sections 10 and 11, which are arranged to be relatively axially adjustable, to adjust the effective pulley diameter. While the driven pulley structure 3, may have a fixed effective pulley diameter.

If as illustrated by Fig. 1, the driven pulley structure 3, has a fixed effective diameter, and if it is desired to adjust the effective diameter of the driving pulley to adjust the speed ratio, then it is necessary to provide means to adjust the belt 2, to the varying diameter of the driving pulley structure. The required adjustment of the belt tension may be obtained by providing means for adjusting the center distance between the driving and driven pulley structures in accordance with the adjustment of the effective pulley diameter.

Figures 2, 4, 5:
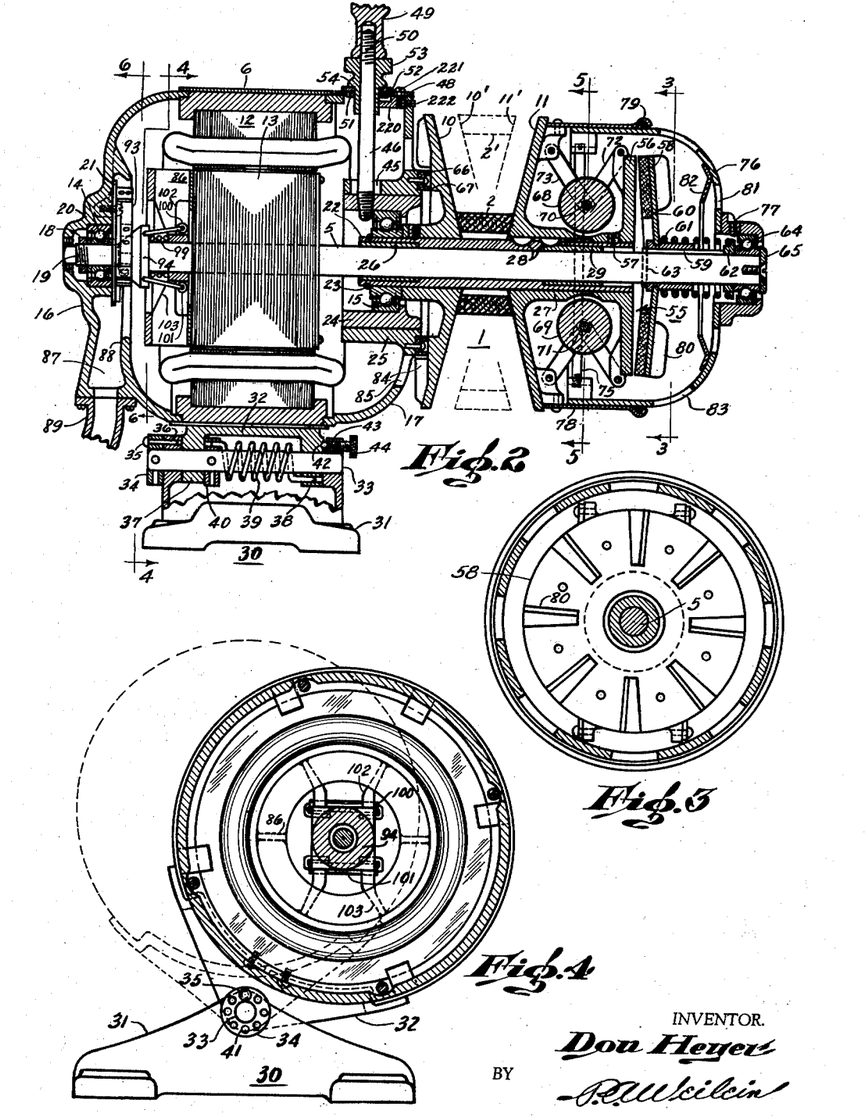
Fig. 2 is a view, partly in section, of the driving motor and of the driving pulley structure of the variable speed drive, illustrated by Fig. 1.
Fig. 4 is a sectional view, taken along the plane 4—4 of Fig. 2.
Fig. 5 is a sectional view, taken along the plane 5—5 of Fig. 2.
Figure 5:
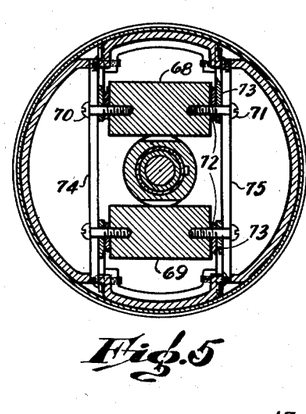

Fig. 2, is a detailed view of the driving motor and the driving pulley structure of Fig. 1, illustrating the means provided for adjusting the effective pulley diameter and for adjusting the center distance between the axes of the driving and driven pulley structures. Referring to Fig. 2, the driving electric motor 6, includes the stator 12 and the rotor 13, which is mounted on the motor shaft 5. The motor shaft 5, is rotatably supported by the bearings 14 and 15, which are in turn supported by the end brackets 16 and 17. Bearing 14 is pressed against a shoulder on the motor shaft and is held against axial movement by the lock nut 18, which engages the threaded end 19, of the motor shaft. The bearing 14, is also held within the bearing housing 20, formed on the end bracket 16, by means of the plate 21. The motor shaft 5, is thus held against axial movement by the bearing 14.

The bearing 15, is mounted on the sleeve 22, which supports the pulley section 10, and is held thereto by the snap ring 23. Bearing 15, is held within the axially adjustable bearing housing 24, which in turn is supported for axial movement by the sleeve 25, formed on the end bracket 17. It is thus obvious from the construction that, an axial movement of the axially adjustable bearing housing 24 results in a corresponding axial movement of the bearing 15, of the sleeve 22, and of the pulley section 10. To provide means for supporting the sleeve 22, for axial movement with respect to the motor shaft 5, the sleeve 22, has pressed therein the bearing bushings 26 and 29.

The sleeve 22, also provides means for supporting the pulley section 11. However, the pulley section 11, is provided with the hub 27, which is axially adjustable with respect to the sleeve 22; but which is held against relative rotation by the keys 28. It is thus obvious that the pulley sections 10 and 11, and the sleeve 22 are constrained to rotate as a unit. However, the sleeve 22, is not directly driven by the motor shaft, but is connected thereto by a clutch mechanism, which will be described hereinafter.

If the pulley sections 10 and 11, are moved axially toward each other by equal increments, so that they occupy the positions 10' and 11', the belt 2, will be forced radially outward to the position 2'. The effective pulley diameter will be thus increased. However, it is to be noted that the center line of the belt remains in a fixed plane.

An increase in the effective pulley diameter requires a decrease in the center distance between the driving and driven pulley structures, if the belt is to be maintained at the required tension.

In the present instance this adjustment of the center distance is provided by means of the adjustable motor base 30, which includes the fixed base member 31, and the movable motor base 32, which is suitably secured to the motor frame, and which is pivotally supported on the base member 31, by the pivot pin 33. The pivot pin 33 is locked to the base member 31 by means of the locking pin 35, which engages the collar 34, secured to the pivot pin and the aperture 36, formed in the base member 31. The motor base 32, is supported on the pivot pin 33, by the arms 37 and 38, formed on the motor base. The arms 37 and 38 are free to rotate on the pivot pin 33. Hoyever, the motor base 32, is constantly urged in a center distance increasing direction by the torsion spring 39, which engages the arm 38, and the collar 40, secured to the pivot pin 33.

To provide means for adjusting the tension of the torsion spring 39, the collar 34 has a plurality of holes 41, formed therein, for engaging the locking pin 35. By means of this construction, the locking pin 35, may be removed to permit the rotation of the pivot pin 33, to produce the desired tension in the torsion spring 39, after which, the locking pin 35, may be inserted in the appropriate hole 41, to lock the pivot pin to the base member 31.

Thus, the operation of the center distance adjusting means takes place as follows: When the effective diameter of the adjustable pulley structure is increased, the driving motor and the adjustable pulley structure pivot about the pivot pin 33, to decrease the center distance. When the diameter of the adjustable pulley structure is decreased, the motor base 32, and the structure mounted thereon are moved by the torsion spring 39, in a center distance increasing direction to take up the belt slack.

To provide means for preventing minor fluctuations in belt tension from varying the center distance, means are provided for locking the motor base 32, in the adjusted position. This locking means includes the ball 42, the compression spring 43, and the spring tension adjusting screw 44. The ball 42 may engage any one of a plurality of shallow indentations formed in the arm 38. The ball 42, is urged into the indentation by the compression spring 43. The adjusting screw 44 may be adjusted so that a small force exerted on the motor base 32, will not be capable of forcing the ball 42 out of the indentation, against the force exerted by the spring 43. However, when the pulley diameter is adjusted, the force exerted by the motor base 32, will be sufficient to overcome the restraining action of the ball 42.

The manner in which the pulley sections 10 and 11 are supported on the sleeve 22, has been described. Consider now the means provided for axially adjusting the pulley sections. The pulley section 10, is axially adjusted by an axial adjustment of the bearing housing 24. To provide means for adjusting the axial position of the bearing housing, the sleeve 25, has the slot 45 formed therein, through which passes the pin 46, secured to the bearing housing 24. The pin 46 also passes through the helical slot 47 formed in the plate 48, which is secured to the end bracket 17. The pin 46, is provided with the control handle 49, which engages the threaded end 50 of the pin. The pin 46 also provides means for rotatably supporting the pinion 51, which engages the rack 52, formed on the plate 48. The pinion 51, is mounted on the sleeve 53, which is provided with a knurled head for manually rotating the pinion.

The pin 46 is guided in the slot 47, by the adjustable guide plates, 219 and 220, which are secured to the plate 48, by the screws 221, and which engage the sleeve 53. The screws 221, pass through slots formed in the plate 48, which permit the plates to be adjusted by a series of set screws 222. The sleeve 53, also has formed thereon the shoulder 54, which can be urged against the plate 48, by a rotation of the control handle 49, on the thread 50.

By means of the construction provided, the bearing housing 24 and the pulley section 10, may be adjusted to any desired axial position and locked in the adjusted position. To adjust the axial position of the bearing housing 24, the control handle 49, is rotated on the thread 50 to release the pressure on the shoulder 54. The control handle 49 and the pin 46, can then be rotated about the axis of the motor shaft. When the pin 46, is rotated about the axis of the motor shaft, the pin is moved axially in the helical slot 47, which results in a corresponding axial adjustment of the bearing housing 24, secured thereto. After the adjustment has been completed, the control handle 49, can be rotated to again lock the shoulder 54, against the plate 48.

The pinion 51 provides means whereby a very exact adjustment of the pulley section 10 may be effected. When the control handle 49 has been rotated to unlock the sleeve 53, the pinion 51 may be manually rotated by a rotation of the knurled sleeve 53. The engagement of the pinion 51 with the rack 52, will then cause the pin 46 to be adjusted axially, by as small an increment as may be desired.

The pulley structure 1, is driven by the clutch 55, which includes the clutch disc 56, which is secured to the sleeve 22, by the set screw 57, and the clutch disc 58, which is keyed to the motor shaft 5, by the key 59. The clutch disc 58, is faced with the ring 60 of yielding material for increasing the frictional force between the clutch discs. The clutch disc 58 is urged toward the disc 56, by the compression spring 61, which engages the reverse side of the disc 58 and the collar 62. The axial movement of the disc 58 is limited by the pin 63, which passes through the motor shaft. When the clutch is disengaged, the disc 58 is held against the pin 63 by the compression spring 61. The collar 62 butts against the inner race of the ball bearing 64, which is held on the motor shaft by the plate 65.

Figure 7:
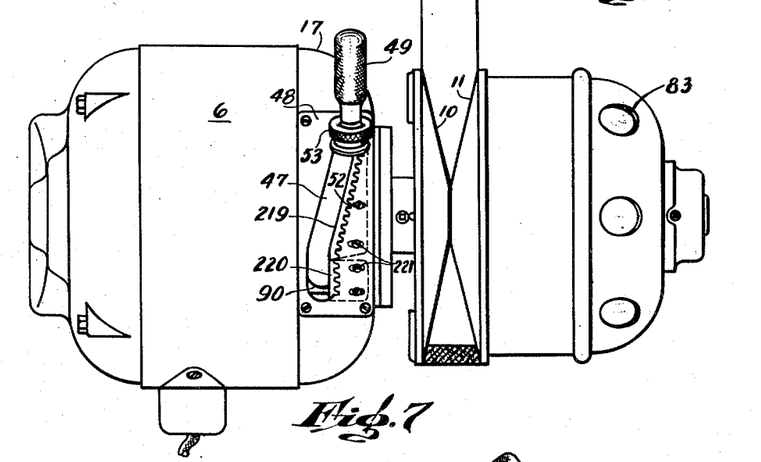
Fig. 7 is a plan view of the driving motor and driving pulley structure of Fig. 2.

The operation of the clutch 55, is effected by means of the control handle 49. Referring to Fig. 7; it is to be noted that the helical slot 47, moves the control handle 49, toward the left, when the control handle is adjusted to decrease the pulley diameter. As the pulley diameter is decreased, the pulley section 10, the sleeve 22 and the clutch disc 56, are all moved as a unit toward the left, as viewed in Figs. 2 and 7. When the clutch 55 is engaged, the compression spring 61, urges the disc 58 toward the clutch disc 56. Thus when the pulley diameter is decreased, the disc 58 is moved toward the left, together with the disc 56. The axial movement of the clutch disc 58 is limited, however by the pin 63. When the clutch disc 58 strikes the pin 63, a further decreasing adjustment of the pulley diameter causes the clutch disc 56 to be moved away from the disc 58 to disengage the pulley structure from the motor shaft 5. Thus when the control handle 49 has been moved to adjust the pulley structure to its minimum diameter, a further movement of the control handle 49 results in the disengagement of the clutch 55.

When the clutch 55, is disengaged, the bearing 15 and the bearing bushings 26 and 29 permit the motor shaft to revolve with respect to the pulley structure. Thus the pulley structure 1 may be brought to rest, to stop the driven load, without the necessity of stopping the driven motor.

To provide means for quickly stopping the driving pulley structure, end bracket 17 has the brake band 66 secured thereto, which engages the face 67 formed on the reverse side of the pulley section 10. When the control handle 49 has been adjusted to disengage the clutch 55, a further adjustment of the control handle 49 causes the sleeve 22 and the pulley section 10 to be moved toward the left, as viewed in Fig. 2, to bring the face 67 against the brake band 66. This position is illustrated by Fig. 2, in which the pulley diameter has been adjusted to its minimum value, the clutch 55 disengaged, and the pulley structure stopped by the engagement of the brake band 66 with the face 67.

The means provided for adjusting the axial position of the pulley section 10 has been described. Consider now the means provided for adjusting pulley section 11 and for interlocking the adjustments of the two pulley sections. The pulley section 11 and the clutch disc 56 have pivotally supported thereon the cylindrical weights 68 and 69. As illustrated by Figs. 2 and 5, each of the weights is provided with pivot pins at each end, which are connected by links to the pulley section 11 and the clutch disc 56. Thus the weight 68 is provided with the pivot pins 70 and 71, which are respectively connected to the clutch disc 56 by a pair of links 72 and to the pulley section 11 by the pair of links 73.

When the clutch disc 56 and the pulley section 11 are rotated, the weights 68 and 69 are urged radially outward by the centrifugal forces acting thereon. It is obvious from the construction, that the links connecting the weights to the clutch disc 56, urge the disc 56 toward the right as viewed in Fig. 2, and that the links connecting the weights to the pulley section 11 urge the pulley section toward the left. As the clutch disc 56 is connected to the pulley section 10, it is obvious that both of the pulley sections are urged toward the driving belt by the rotation of the weights 68 and 69.

To provide means for interlocking the axial adjustments of the pulley sections, the weights 68 and 69 are held in fixed axial position with respect to the motor shaft. A radial movement of the weights is thus accompanied by an equal and opposite axial adjustment of the pulley sections. The axial position of the weights 68 and 69 is fixed by a pair of guide rods 74 and 75, which are located at each end of the cylindrical weights. The centrifugal force created by the rotation of the weights urges the pivot pins against the guide rods 74 and 75. Thus the cylindrical weights are capable of movement only in a radial direction. The guide rods 74 and 75 are threaded into the cup 76, which in turn is locked to the outer race of the ball bearing 64 by the set screw 77. The cup 76 and the guide rods 74 and 75 are thus held in fixed axial position.

To provide an enclosure for the clutch mechanism and the associated pulley structure, the pulley section 11 has the sleeve 78 secured thereto, which telescopes over the cup 76. The sleeve 78 carries the seal ring 79 which engages the cup 76.

To provide means for cooling the clutch 55, the disc 58 has the fan blades 80 formed on the reverse side thereof. The fan blades 80 draw air into the cup 76 through the apertures 81, the air deflector 82, guides the air over the reverse side of the clutch disc 58 and out through the apertures 83.

It is to be noted, that while the axial position of the pulley sections 10 and 11 is determined by the position of the control handle 49, only a small force is required to adjust the pulley diameter. For the pulley sections 10 and 11 are held in driving relation to the belt 2 by the centrifugal force acting on the weights 68 and 69. Thus only a small additional force is required to be exerted on the control handle 49 to adjust the pulley diameter.

To provide means for cooling the motor structure the pulley section 10 has the fan blades 84 formed on the reverse side thereof, which draw air out of the motor structure through the apertures 85, formed in the end bracket 17. Air is drawn into the motor by the fan 86 secured to the motor shaft. The air is drawn into the motor structure through the downwardly directed air intake passage 87 formed in the end bracket 16 and the air deflector 88. If the motor is employed in an atmosphere ladened with corrosive fumes or abrasive materials, air may be supplied to the motor from a remote location by the air intake duct 89, secured to the end bracket 16.

In many variable speed power applications, it is desirable to start the driven load at the low speed position. In the present instance means are provided for preventing the starting of the driving motor, except in the low speed position of the variable speed drive. For this purpose, the plate 48 has the slot 90 formed therein, which permits a further movement of the control handle 49, after the speed ratio has been adjusted to the minimum value. When the control handle 49 has been rotated to the extreme position illustrated by Fig. 8, the rod 46 strikes the lever 91, of the toggle switch 92, thereby interrupting the motor circuit and the operation of the driving motor.

Figure 8:
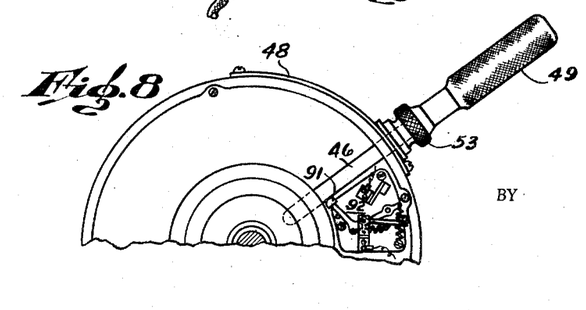
Fig. 8 is a detailed view of the means provided for controlling the operation of the driving motor, illustrated by Fig. 2.

When it is desired to start the driving motor, the control handle 49 is moved in the slot 90, until the rod 46 is withdrawn from the lever 91, allowing the toggle switch 92 to close, thereby starting the motor. A further movement of the control handle 49, moves the pulley section 10 away from the brake band 66, permitting the rotation of the pulley structure. A further movement of the control handle 49 forces the clutch disc 56 into engagement with the disc 58. While a still further movement of the control handle 49 is effective to increase the pulley diameter.

Figure 6:
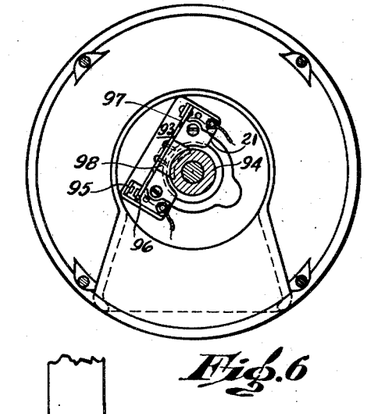
Fig. 6 is a sectional view, taken along the plane 6—6 of Fig. 2.

In Fig. 2 the motor 6 has been illustrated as a split phase, single phase motor. To provide means for disengaging the starting winding from the power supply, the motor is provided with the switch mechanism 93. The current carrying part of the switch mechanism 93 is mounted on the plate 21, secured to the end bracket 16. The motor shaft has the conical member 94 mounted thereon for actuating the switch mechanism. As illustrated by Fig. 6, the switch mechanism 93 includes the fixed contact 95 and the movable contact 96 mounted on the leaf spring 97. The leaf spring constantly urges the movable contact 96 to the open position, while the contact 96 is held closed by the engagement of the conical member 94 with the insulating member 98, carried by the leaf spring. As illustrated by Fig. 2, the conical member 94 is urged toward the left by the compression spring 99. The conical member 94 has pivotally mounted thereon, the rollers 100 and 101, which engage the arms 102 and 103. When the motor is started the centrifugal force, acting on the rollers 100 and 101, causes them to move radially outward over the arms 102 and 103, thereby moving the conical member 94 in an axial direction, toward the right as viewed in Fig. 2, thereby permitting the leaf spring 97 to separate the contacts 95 and 96.

The operation of the motor control circuit is illustrated by the Fig. 8a. Power may be supplied to the motor by the leads 104 and 105, which are connected to a source of alternating current power supply. The running winding 106 of the motor 6, is connected by the lead 108 to the lead 105, and by the lead 107, and the toggle switch 92, to the lead 104. One side of the starting winding 109, is connected to the lead 107 and the other side of the starting winding is connected by the lead 110 and the centrifugally actuated switch 93, to the lead 105.

The structural details of the various parts of the variable speed drive have been described, consider now the operation of the drive. The motor is started with the driving pulley adjusted to its minimum diameter, as is illustrated by Fig. 2, and with the brake band 66 in engagement with the face 67 of the pulley section 10. The starting of the motor is effected by a rotation of the control handle 49, in a counter clockwise direction, as viewed in Fig. 8, permitting the toggle switch 92 to close to connect the motor windings to the power leads 104 and 105 of Fig. 8a. A further movement of the control handle 49 causes the sleeve 22 and the pulley section 10 to be moved toward the right as viewed in Fig. 2, to disengage the brake band 66. A still further movement of the control handle 49, brings the clutch disc 56 into engagement with the clutch disc 58, thereby starting the rotation of the pulley structure 1. The effective diameter of the adjustable pulley structure 1, may then be increased by a still further movement of the control handle 49.

Figure 9:
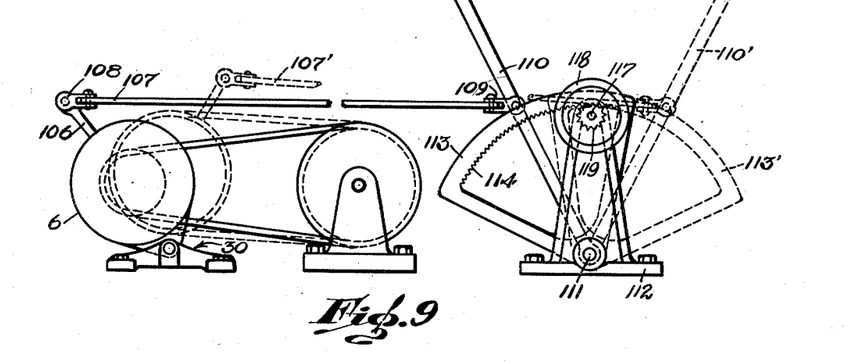
Fig. 9 is a side elevation of a variable speed drive, embodying another form of the invention.
Figure 10:
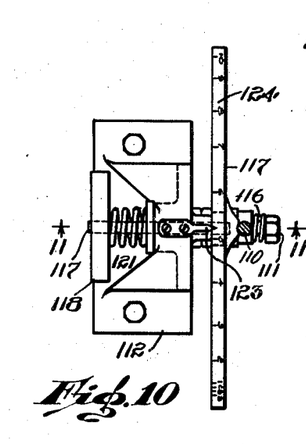
Fig. 10 is a fragmentary plan view of the speed adjusting mechanism of the variable speed drive illustrated by Fig. 9.
Figure 11:
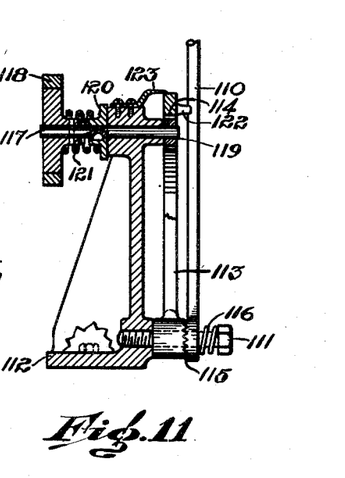
Fig. 11 is a view, partly in section, of the speed adjusting mechanism of the variable speed drive illustrated by Fig. 9, as viewed from the right hand side of Fig. 9.

Figs. 9, 10 and 11, illustrate a form of the invention in which means are provided for adjusting the speed ratio of the variable speed drive from a remote location, and in which means are provided for returning the driving pulley structure to its point of previous adjustment, after the driving pulley structure has been disengaged from the driving motor, for the purpose of stopping the driven load.

Referring to Fig. 9; the driving motor 6 and the driving pulley structure mounted thereon are mounted on the adjustable motor base 30. The structure of the driving motor 6, and of the adjustable diameter pulley structure, may be similar in every detail to that of Fig. 2, except that the control handle 49 is replaced by the control lever 106, which forms a continuation of the rod 46. The control lever 106 is connected to the rod 107 by the link 108, which is pivotally supported on both the control lever 106 and the rod 107. The rod 107 is connected by the link 109, to the hand lever 110. The link 109 is pivotally connected to both, the rod 107 and the hand lever 110. The hand lever 110 is pivotally supported on the pin 111, which is theaded into the pedestal 112. The pivot pin 111 has also mounted thereon the member 113, having the internal quadrant gear 114 formed thereon. The hand lever 110 and the member 113 have the ratchet teeth 115 formed thereon, which are urged into engagement by the compression spring 116. The hub of the member 113 is in turn urged by the compression spring 116, into frictional engagement with the pedestal 112. The pedestal 112 also has pivotally supported thereon, the shaft 117, which carries on one end thereof, the wheel 118 and on the other end thereof, the pinion gear 119, which is in engagement with the internal gear 114.

The shaft 117 also carries thereon, the collar 120, which is splined to the shaft, and the compression spring 121, which urges the wheel 118 and the shaft 117, toward the left, as viewed in Fig. 11. The pinion gear 119 is suitably held to the shaft 117, by a press fit. The spring 121 thus urges the pinion 119, into frictional engagement with the pedestal 112. This frictional force is sufficient to hold the member 113 and the hand lever 110 in the adjusted position, against any force exerted on the rod 107 by the driving motor and the driving pulley structure. In addition to the ratchet 115, the hand lever 110 is releasably locked to the member 113, by the notched member 122, which is carried by the member 113 and which engages the hand lever 110. However, the hand lever 113 is made sufficiently flexible that it may be sprung toward the right, as viewed in Fig. 11, to disengage the hand lever from the notched member 122. The ratchet teeth 115 are also made sufficiently shallow to permit the hand lever 110 to be moved with respect to the member 113, to effect an adjustment of the diameter of the driving pulley structure.

When the hand lever 110 is in engagement with the notched member 122, the speed ratio of the drive may be adjusted by a rotation of the wheel 118; for a rotation of the wheel 118, results in a rotation of the pinion 119, and in a resultant pivotal movement of the member 113 and of the hand lever 110. The wheel 118 may be rotated by any suitable means, such as the foot of the operator, of the machine driven by the driving motor 6.

For indicating the speed ratio adjustment of the variable speed drive, the pedestal 112 may have secured thereto the pointer 123, which indicates the speed ratio adjustment on the scale 124, carried on the member 113.

During the operation of the driven machine, the speed ratio may be adjusted by a rotation of the wheel 118. However, if it is desired to stop the driven machine, or to temporarily change its speed adjustment, this may be effected by disengaging the hand lever 110, and making the necessary adjustment by a manipulation of the hand lever. When it is desired to bring the driving machine to its previous point of operation, this may be effected by moving the hand lever 110 until it is brought into engagement with the notched member 122.

I claim:

1. In combination, an adjustable pulley structure having a pair of pulley sections with opposed inclined faces forming by relative axial adjustment variable effective pulley diameters, a shaft having said pulley sections mounted thereon, manual control means cooperating with centrifugal means operative upon rotation of the shaft for adjusting the axial position of said pulley sections by substantially equal and opposite increments, and means for movably mounting said adjustable pulley structure to vary the center distance between the axes of the driving and driven pulley structures, said movably mounting means being provided with tensioning means to urge the said movably mounting means in a center distance increasing direction.

2. In combination, an adjustable diameter pulley structure having a pair of pulley sections with opposed inclined belt engaging faces forming by relative axial adjustment variable effective pulley diameters, a shaft having said pulley sections mounted thereon, clutch means for connecting said shaft to said pulley sections, and manual control means cooperative with centrifugal means operative upon rotation of the pulley structure for urging both of said pulley sections toward the engaging belt.

3. In a driving structure for an adjustable speed pulley drive in which the variation in speed is obtained by a relative adjustment of the effective pulley diameters; an electric motor having a frame and a shaft axially fixed with respect to the frame, an adjustable pulley structure mounted on said shaft, said pulley structure having a pair of pulley sections with opposed inclined belt engaging faces forming by relative axial adjustment variable effective pulley diameters, clutch means for connecting said pulley sections to said shaft, and manual control means cooperating with centrifugal means operative upon rotation of the pulley structure for adjusting the relative axial positions of said pulley sections, the said manual control means, upon the initial actuation thereof engaging said clutch and, upon further actuation thereof, controlling the pulley adjustment from minimum to maximum pulley diameter.

4. In combination, an adjustable pulley structure having a pair of pulley sections with opposed inclined belt engaging faces forming by relative axial adjustment variable effective pulley diameters, a shaft having said pulley sections mounted thereon, a clutch having a pair of engaging power transmitting members, one of said members being constrained to rotate with said shaft and the other of said members being connected to said pulley sections, and common manual control means for operating said clutch and for controlling the axial positions of said pulley sections, the initial actuation of said manual control means operating to engage said clutch members and the further actuation of said manual control means cooperating with centrifugal means to adjust the effective pulley diameter.

5. In combination, an adjustable pulley structure having a pair of pulley sections with opposed inclined belt engaging faces forming by relative axial adjustment variable effective pulley diameters, a shaft having said pulley sections mounted thereon, means for rotatably supporting said pulley sections with respect to said shaft, a clutch having a pair of power transmitting members, one of said members being constrained to rotate with said shaft and the other of said members being in driving relation to said pulley sections, and manual control means for operating said clutch, said manual control means cooperating with centrifugal means to actuate said pulley sections and operative upon engagement of said clutch for urging said pulley sections toward each other.

6. In combination, an adjustable pulley structure having a pair of pulley sections with opposed inclined belt engaging faces forming by relative axial adjustment variable effective pulley diameters, a shaft having said pulley sections mounted thereon, means for rotatably supporting said pulley sections with respect to said shaft, a clutch having a pair of power transmitting members, one of said members being constrained to rotate with said shaft and the other of said members being in driving relation to said pulley sections, manual control means cooperating with centrifugal means to actuate said pulley sections and operative upon engagement of said clutch for urging said pulley sections into driving relation with the driven belt, and brake means operative upon disengagement of the clutch for retarding the rotation of said pulley sections.

7. In a driving structure for an adjustable speed pulley drive in which the variation in speed is obtained by relative adjustment of the effective diameters of the driving and driven pulley structures; an electric motor having a shaft, an adjustable pulley structure mounted on said shaft, said pulley structure having a pair of pulley sections with opposed inclined belt engaging faces forming by relative axial adjustment variable effective pulley diameters, means for rotatably supporting said pulley sections with respect to said shaft, a clutch having a pair of power transmitting members, one of said members being constrained to rotate with said shaft and the other of said members being in driving relation to said pulley sections, manual control means cooperating with centrifugal means connected to said pulley sections and operative upon engagement of said clutch for urging said pulley sections into driving relation with the driven belt, brake means for stopping rotation of said pulley sections, and a circuit controller for connecting said electric motor to a source of electric power supply, said manual control means consecutively disengaging said clutch, disconnecting the power from the pulley sections for applying said brake to stop the rotation of the pulley sections, and finally operating said circuit controller to stop the driving motor.

8. In combination, an adjustable diameter pulley structure having a pair of pulley sections with opposed inclined belt engaging faces forming by relative axial adjustment variable effective pulley diameters, a shaft having said pulley sections mounted thereon, manual control means cooperating with centrifugal means operative upon rotation of the pulley structure for urging both of said pulley sections toward the engaging belt, a clutch having a pair of engaging power transmitting members, one of said members being constrained to rotate with said shaft and the other of said members being connected to said pulley sections, and fan means rotated by said shaft for providing a flow of cooling air for said clutch means.

9. In a driving structure for an adjustable speed drive in which the variation in speed is obtained by relative adjustment of the effective diameters of the driving and driven pulley structures; a prime mover having a shaft, an adjustable pulley structure mounted on said shaft, said pulley structure having a pair of pulley sections with opposed inclined belt engaging faces forming by relative axial adjustment variable effective pulley diameters, means for rotatably supporting said pulley sections with respect to said shaft, a clutch having a pair of power transmitting members, one of said members being constrained to rotate with said shaft and the other of said members being in driving relation to said pulley sections, manual control means cooperating with centrifugal means operative upon engagement of said clutch for urging said pulley sections into driving relation with the driven belt, and brake means for stopping rotation of said pulley sections, said manual control means consecutively disengaging said clutch to permit free rotation of the pulley sections, applying said brake to stop the rotation of said pulley sections, and finally interrupting the operation of said prime mover.

10. In combination, an adjustable diameter pulley structure having a pair of pulley sections with opposed inclined belt engaging faces forming by relative axial adjustment variable effective pulley diameters, a shaft having said pulley sections mounted thereon, manual control means cooperating with centrifugal means operative upon rotation of the pulley structure for urging both of said pulley sections toward the engaging belt, said manual control means positively adjusting the axial position of one of the pulley sections, and means interlocked with said centrifugal means for adjusting the axial position of the other pulley sections by an equal and opposite increment.

11. In combination, an adjustable pulley structure having a pair of pulley sections with opposed inclined faces forming by relative axial adjustment variable effective pulley diameters, positive means for adjusting the axial position of one of said pulley sections, and yielding means for oppositely and substantially equally adjusting the axial position of the other of said pulley sections to maintain the driven belt in a substantially fixed axial position for varying pulley diameters.

12. In combination, an adjustable pulley structure having a pair of pulley sections with opposed inclined faces forming by relative axial adjustment variable effective pulley diameters, a shaft having said pulley sections mounted thereon, manual control means cooperating with centrifugal means operative upon rotation of the shaft for adjusting the axial position of said pulley sections by substantially equal and opposite increments, and means for movably mounting said adjustable pulley structure to vary the center distance between the axes of the driving and driven pulley structures said movably mounting means being provided with means for preventing minor fluctuations in the belt tension during starting and overload periods.

DON HEYER.